US012688285B2

(12) United States Patent
Briongos et al.

(10) Patent No.: US 12,688,285 B2
(45) Date of Patent: Jul. 21, 2026

(54) MECHANISM TO PREVENT LEAKAGE THROUGH SIDE CHANNELS IN CACHE MEMORY

(71) Applicant: NEC Laboratories Europe GmbH, Heidelberg (DE)

(72) Inventors: Samira Briongos, Heidelberg (DE); Claudio Soriente, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 287 days.

(21) Appl. No.: 18/503,239

(22) Filed: Nov. 7, 2023

(65) Prior Publication Data

US 2025/0068732 A1     Feb. 27, 2025

Related U.S. Application Data

(60) Provisional application No. 63/534,129, filed on Aug. 23, 2023.

(51) Int. Cl.
*G06F 21/55* (2013.01)
*G06F 21/54* (2013.01)

(52) U.S. Cl.
CPC ............. *G06F 21/556* (2013.01); *G06F 21/54* (2013.01); *G06F 21/554* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 10,311,229 | B1 * | 6/2019 | Pohlack | .............. G06F 9/45558 |
| 10,860,714 | B2 | 12/2020 | Browne et al. | |
| 11,055,226 | B2 | 7/2021 | Sukhomlinov | |
| 11,263,015 | B1 | 3/2022 | Mukherjee | |
| 11,307,857 | B2 | 4/2022 | Mukherjee | |
| 11,748,490 | B2 * | 9/2023 | Austin | ................... G06F 21/566 726/22 |
| 2018/0011790 | A1 * | 1/2018 | Gaur | .................... G06F 12/0897 |
| 2018/0089091 | A1 * | 3/2018 | Akenine-Moller | .......................... G06F 12/0875 |
| 2018/0165205 | A1 * | 6/2018 | Sasanka | .............. G06F 12/0808 |

(Continued)

FOREIGN PATENT DOCUMENTS

| | | | | |
|---|---|---|---|---|
| CN | 1114114616 | A | 7/2020 | |
| CN | 114077553 | A * | 2/2022 | ......... G06F 12/0615 |
| CN | 113420287 | B | 7/2022 | |

OTHER PUBLICATIONS

Bandara, Sarah et al.; "Adaptive Caches as a Defense Mechanism Against Cache Side-Channel Attacks"; *Proceedings of the 3rd ACM Workshop on Attacks and Solutions in Hardware Security (ASHES'19)*; Nov. 15, 2019; pp. 55-64; ACM Publications; New York, NY, USA.

(Continued)

*Primary Examiner* — Sakinah White-Taylor
(74) *Attorney, Agent, or Firm* — Leydig, Voit & Mayer, Ltd.

(57) ABSTRACT

A computer-implemented method mitigates side channel attacks in cache memory. The method includes: loading data into a cache line of the cache memory, which includes marking the data as sensitive in metadata of the cache line based on the data being tagged as sensitive; tracking interactions with the data; and determining whether the interactions with the data are not normal based on a preset criteria and the tracked interactions with the data.

19 Claims, 4 Drawing Sheets

(56) References Cited

U.S. PATENT DOCUMENTS

| | | | |
|---|---|---|---|
| 2019/0121966 A1 | 4/2019 | Park et al. | |
| 2019/0138720 A1* | 5/2019 | Grewal | G06F 9/3863 |
| 2020/0202012 A1* | 6/2020 | Shanbhogue | G06F 12/0804 |
| 2022/0012188 A1* | 1/2022 | Durham | G06F 21/79 |
| 2022/0100907 A1* | 3/2022 | Basak | G06F 21/52 |
| 2022/0207138 A1* | 6/2022 | Rozas | G06F 21/75 |
| 2023/0022096 A1* | 1/2023 | Calciu | G06F 9/45558 |
| 2023/0110049 A1* | 4/2023 | Bhalerao | G06F 21/554 |
| | | | 726/22 |

OTHER PUBLICATIONS

Chen, Yue et al.; "Secure In-Cache Execution"; *20th International Symposium on Research in Attacks, Intrusions, and Defense (RAID)*; Jul. 29, 2017; pp. 1-20; Springer Publishing; New York, NY, USA.

Cho, Haehyun et al.; "SMOKEBOMB: Effective Mitigation Against Cache Side-channel Attacks on the ARM Architecture"; *Proceedings of the 18th Annual International Conference on Mobile Systems, Applications, and Services (MobiSys '20)*; Jun. 15, 2020; pp. 107-120; ACM Publications; New York, NY, USA.

Dessouky, Ghada et al.; "CHUNKED-CACHE: On-Demand and Scalable Cache Isolation for Security Architectures"; *29th Annual Network and Distributed System Security Symposium (NDSS)* 2022; Oct. 15, 2021; pp. 1-18; vol. 1; ArXiv.org, Cornell University; Ithaca, NY, USA.

Deutsch, Peter W. et al.; " Metior: A Comprehensive Model to Evaluate Obfuscating Side-Channel Defense Schemes"; *ISCA '23: Proceedings of the 50th Annual International Symposium on Com-*

*puter Architecture*; Jun. 17, 2023; pp. 1-16; Art No. 38; ACM Publications; New York, NY, USA.

Kumar, Naveen et al.; "A Triggered Delay-based Approach against Cache Privacy Attack in NDN"; *International Journal of Networked and Distributed Computing*; Jul. 1, 2018; pp. 174-184; vol. 6, No. 3; Atlantis Press; Amsterdam, The Netherlands.

Ojha, Divya et al.; "TimeCache: Using Time to Eliminate Cache Side Channels when Sharing Software"; *2021 ACM/IEEE 48th Annual International Symposium on Computer Architecture (ISCA)*; Jun. 14, 2021; pp. 375-387; IEEE; Piscataway, NJ, USA.

Song, Minkyu et al.; "RT-Sniper: A Low-Overhead Defense Mechanism Pinpointing Cache Side-Channel Attacks"; *Electronics*; Nov. 10, 2021; pp. 1-15; vol. 10, No. 2748; MDPI; Basel, Switzerland.

Subodha, Charles et al.; "Efficient Cache Reconfiguration Using Machine Learning in NoC-Based Many-Core CMPs"; *ACM Transactions on Design Automation of Electronic Systems*; Sep. 9, 2019; pp. 1-23; vol. 24, No. 6, Art No. 60; ACM Publications; New York, NY, USA.

Tang, Bowen et al.; "SPECWANDS: An Efficient Priority-based Scheduler Against Speculation Contention Attacks"; *IEEE Transactions on Computer-Aided Design of Integrated Circuits and Systems*; Apr. 16, 2023; pp. 1-17; vol. 2; ArXiv.org, Cornell University; Ithaca, NY, USA.

Zhang, Yue et al.; "Ddm: A Demand-based Dynamic Mitigation for SMT Transient Channels"; *2019 IEEE Intl Conf on Parallel & Distributed Processing with Applications, Big Data & Cloud Computing, Sustainable Computing & Communications, Social Computing & Networking*; Oct. 26, 2019; pp. 614-621; vol. 1; ArXiv.org, Cornell University; Ithaca, NY, USA.

* cited by examiner

400

414

Processor(s) — 402

Memory — 404

I/O — 406

Sensor(s) — 408

UI(s) — 410

Actuator(s) — 412

FIG. 4

MECHANISM TO PREVENT LEAKAGE THROUGH SIDE CHANNELS IN CACHE MEMORY

CROSS-REFERENCE TO RELATED APPLICATION

Priority is claimed to U.S. Provisional Patent Application No. 63/534,129, filed on Aug. 23, 2023, the entire disclosure of which is hereby incorporated by reference herein.

FIELD

The present disclosure relates to a method, system, data structure, computer program product, and computer-readable medium for preventing information leakage through side channels in cache memory.

BACKGROUND

Cache memories (or simply, cache) are fast memories located, for example, between a processor and the main memory of a computer. The cache may store data fetched from the main memory, thereby reducing access latency on subsequent accesses by the processor. The time difference between the processor fetching data from the main memory (cache miss) or from the cache (cache hit) can be exploited to leak information from running processes. Leakage is possible because processes running on the same computer share cache, and each process is able to determine (e.g., by means of access times) whether the cache state changes. Thus, malicious processes are able to determine whether a piece of data resides in the cache or not. A malicious process that aims to acquire information leaked in this manner can be referred to as a side channel attack.

In general, all such side channel attacks follow a similar pattern. First, the malicious process primes the cache by bringing the cache to a known state. Then, the victim process is allowed to run. Finally, the malicious process checks if the cache state has changed, thereby inferring whether the victim has accessed a specific data item.

SUMMARY

An aspect of the present disclosure provides a computer-implemented method that mitigates side channel attacks in cache memory. The method includes: loading data into a cache line of the cache memory, which includes marking the data as sensitive in metadata of the cache line based on the data being tagged as sensitive; tracking interactions with the data; and determining whether the interactions with the data are not normal based on a preset criteria and the tracked interactions with the data.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following:

FIG. 4 is a block diagram of an exemplary processing system, which can be configured to perform any and all operations disclosed herein.

DETAILED DESCRIPTION

Figure 1:
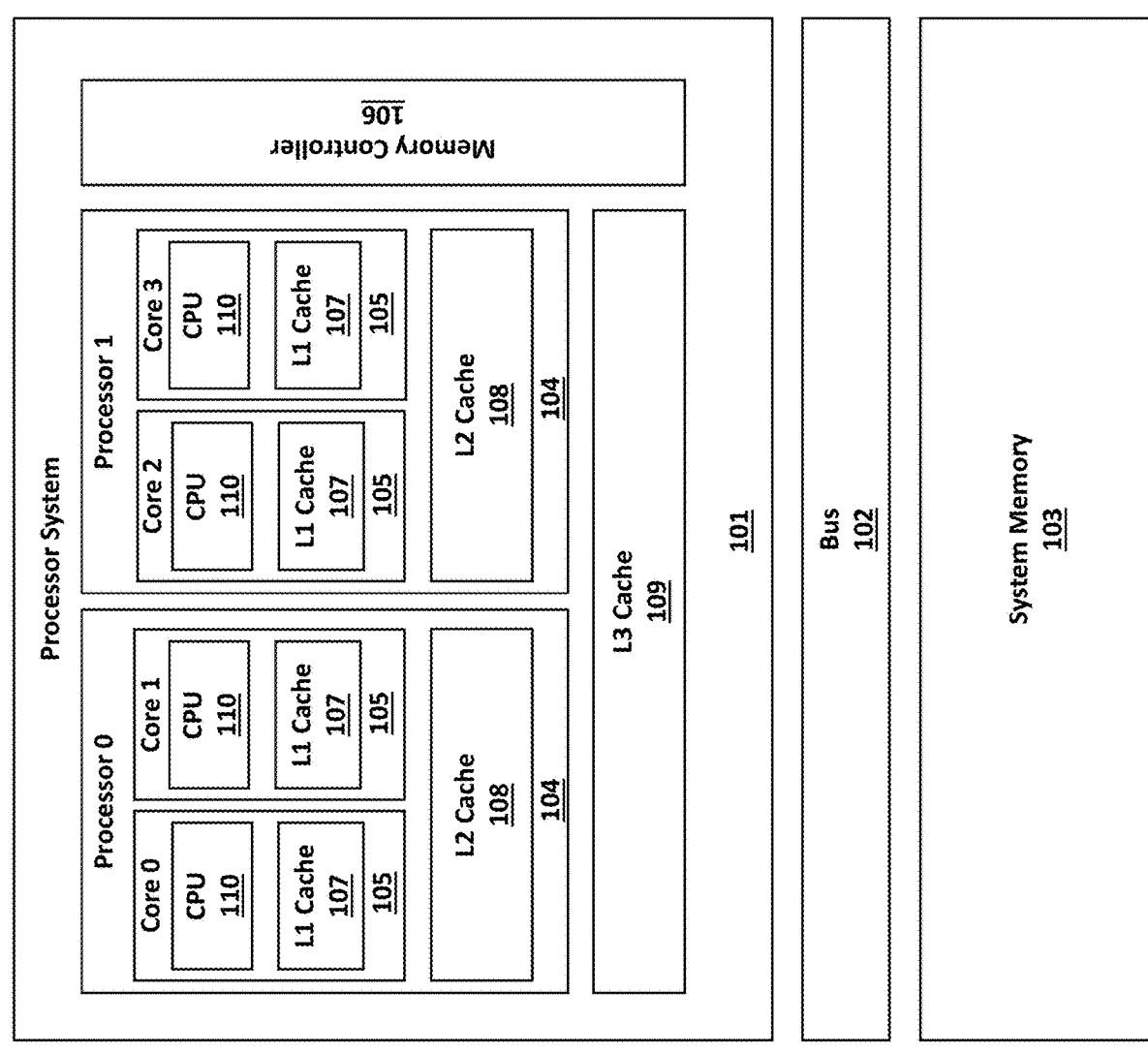
FIG. 1 illustrates a block diagram of a computer system.

Embodiments of the present disclosure provide solutions to overcome a technical problem specific to computer systems: the problem of information leakage through side channels of cache memories (so-called "side channel attacks"). In particular, embodiments of the present disclosure provide a side channel attack detection mechanism and an on-demand countermeasure to mitigate information leakage through side channel attacks exploiting the cache.

As explained above, side channel attacks are a significant problem in computer systems causing data protection and privacy issues. Existing technologies have sought to address side channel attacks on cache memories, including by providing alternative cache designs, which can be essentially classified into two categories: cache randomization and cache partitioning.

Cache partitioning separates the cache memory across processes or security domains so that changes made to the cache by one process are not visible to the others. While this technique effectively prevents information leakage based on the cache, it incurs a high computational performance penalty because partitioning the cache effectively reduces the amount of cache available to processes, thereby reducing computational performance and available computational resources.

Cache randomization uses a periodic reconfiguration of the cache that changes the function that defines the mapping between physical memory addresses and cache memory lines (the location in the cache where data is stored). Changing this mapping prevents the malicious process or adversary from bringing the cache to a known state as a prerequisite of a cache-based attack. Cache randomization techniques, however, likewise trade-off computational performance for security. In particular, the mapping function should be updated frequently to minimize the window of opportunity allowed to an attacker, which is essentially the time during which the mapping function is not changed. However, each time the mapping function is updated, the cache is effectively flushed so that processes experience longer access times, thereby reducing computational performance.

In contrast to existing technologies, embodiments of the present disclosure provide security against side channel attacks and mitigate information leakage without the sacrifices in computational performance and computational resources experienced in existing technology. Embodiments attain such advantages via implementing one or both implementing a side channel attack detection mechanism and an on-demand countermeasure to mitigate information leakage through side channel attacks.

Embodiments of the present disclosure provide a mechanism to monitor the cache for suspicious process activity (e.g., a process priming the cache or flushing a cache line). When suspicious activity is detected, a cache reconfiguration mechanism or a countermeasure is triggered that effectively halts the cache-based attack of the malicious process.

For example, in a first aspect of the present disclosure, a method is provided for protecting cache memories against cache attacks and preventing leakage caused by the interactions with other processes. The method includes:

1) Labeling the data of a program that needs cache protection, defining a tolerance value that determines the number of allowed interactions with protected data, and including one bit in the cache metadata to track such data;

2) Tracking or monitoring interactions through the cache memory of protected data with any other process; and 3) Triggering a countermeasure that prevents the leakage through the cache whenever suspicious behavior as defined by the tolerance parameters is detected.

According to a second aspect, the present disclosure provides a computing system with the following improvements and technical advantages over existing technology:

1) Having a designated "protected" bit in each cache line of a process to be protected, and defining tolerance parameters for the detection of cache attacks to enable a protection mechanism for the process; and 2) Triggering a countermeasure when the number of detected cache interactions between any data and a cache line with the protected bit set to 1 crosses a threshold defined by the tolerance. The protection mechanism can advantageously be triggered only when attacks are detected, thereby avoiding a performance penalty when no malicious process is running on the platform.

A third aspect of the present disclosure provides a computer-implemented method that mitigates side channel attacks in cache memory. The method includes: loading data into a cache line of the cache memory, which includes marking the data as sensitive in metadata of the cache line based on the data being tagged as sensitive; and tracking interactions with the data; determining whether the interactions with the data are not normal based on a preset criteria and the tracked interactions with the data.

In a first implementation of the third aspect, in any implementation of the method, the method further comprises triggering an attack countermeasure based on determining that the interactions with the data are not normal.

According to a second implementation of the third aspect, in any implementation of the method, the preset criteria may be a tolerance parameter setting a number of interactions with the data. Further, determining whether the interactions with the data are not normal may include determining that the number of tracked interactions exceeds the tolerance parameter.

According to a third implementation of the third aspect, in any implementation of the method, the data may be used by a first process, and tracking the interactions with the data may include tracking a number of interactions with the data only by one or more processes different than the first process.

According to a fourth implementation of the third aspect, in the method according to the second implementation, upon loading the data into the cache memory, a process identification field of the metadata in the cache line is set identifying the first process as an owner of the data, and the method further includes identifying the interactions with the data as being done only by one or more of the processes being different than the first process is based on a process identification of an interacting process being different than that in the process identification field.

According to a fifth implementation of the third aspect, in the method according to the second implementation, the interactions include cache loads or cache evictions.

According to a sixth implementation of the third aspect, in any implementation of the method, the metadata of the cache line may include a sensitivity bit, and marking the data as sensitive in the metadata of the cache line may include setting the sensitivity bit based on the data being tagged as sensitive.

According to a seventh implementation of the third aspect, in any implementation of the method, the attack countermeasure may impede an interaction of data belonging to any other process other than a process that has been previously identified as owning the data.

According to an eighth implementation of the third aspect, in the seventh implementation of the method, upon triggering the attack counter measure, a randomization of a cache mapping function may be executed.

According to a ninth implementation of the third aspect, in the seventh implementation of the method, upon triggering the attack counter measure, a partitioning of the cache mapping may be executed.

According to a tenth implementation of the third aspect, in the seventh implementation of the method, upon triggering the attack counter measure, a modification of a cache replacement policy may be executed.

According to an eleventh implementation of the third aspect, in any implementation of the method, the method may further include, prior to loading the data into the cache line: receiving executable code compiled from source code by a compiler, the source code having program data labelled as sensitive by a programmer, the executable code being produced by the compiler such that a computer system executing the code is configured to detect the program data labelled as sensitive in the executable code; executing the executable code and detecting the program data labelled as sensitive. The program data labelled as sensitive includes the data loaded into the cache line.

According to a twelfth implementation of the third aspect, in any implementation of the method, the method may further include, determining second data is not labeled as sensitive; loading the second data into a second cache line of the cache without marking the second data as sensitive in metadata of the second cache line; and operating on the second data without tracking interactions with the second data.

A fourth aspect of the present disclosure provides a computer system comprising one or more hardware processors which, alone or in combination, are configured to provide for execution of the method or computing system of the above discussed aspects:

A fifth aspect of the present disclosure provides a tangible, non-transitory computer-readable medium having instructions thereon which, upon being executed by one or more hardware processors, alone or in combination, provide for execution of the method or computer system of the above discussed aspects.

Embodiments of the present disclosure thus provide to detect cache contention between data belonging to different processes and then trigger a countermeasure or a mechanism that prevents one process from removing data of other processes from the cache, whenever it is needed. Detection can be based on one or more parameters defined by the application developer. This approach avoids the periodic reconfiguration of randomized caches (or only enforces it in case of an attack) and, at the same time, enforces cache partition only for certain operations during a limited time, thereby improving the performance of the cache while providing guarantees that the cache is not being exploited to leak information.

FIG. 1 illustrates a block diagram of an exemplary computer system 100. The computer system 100, as illustrated, includes a multi-processor, multi-core processor system 101, a bus 102, and system memory 103. The present disclosure is not limited to the exemplary computer system, and in fact can be variously applied to different computer systems operating with cache as would be within the knowledge of a person of ordinary skill in the art. Indeed, advantageously, embodiments of the present disclosure do not assume or require any particular design of the cache, and therefore can be applied to any cache memory in any computer system. For example, a computer system may include one cache or a hierarchy of caches (such as in the exemplary embodiment of FIG. 1). In the latter case, some caches are core private, whereas others are shared among cores.

The processor system 101 of FIG. 1 includes two processors 104 (processor 0 and processor 1), each with two cores (Cores 0-3), a memory controller 106, and cache memory. The cache memory of FIG. 1 is divided into three levels: L1 cache 107, L2 cache 108, and L3 cache 109.

The L1 (Level 1) cache 107 is the fastest memory that is present in the computer system 100. L1 cache 107 may reside within each of the cores 105 (core 0-3), and be dedicated only to such core for use by its associated CPU 110 (i.e., not shared). In terms of priority of access, the L1 cache has the data the CPU 110 is most likely to need while executing a current process, task, thread, etc. The L1 cache 107 may be split into multiple sections, e.g., the instruction cache and the data cache. The instruction cache may store the information about the operation that the CPU 110 must perform, while the data cache may hold the data on which the operation is to be performed. The L1 cache 107 may be the smallest cache set within the hierarchy.

The L2 (Level 2) cache 108 is slower than the L1 cache 107, but bigger in size. The L2 cache 108 is usually not split (at least not as a rule), and may act as a common repository for the L1 cache 107. The L2 cache 108 can be shared between multiple cores 105, or indeed between a core 105 and other agents (e.g., another processor, such as a graphics processor). It is, however, possible to lockdown L2 cache data on a per-master per-way basis, enabling management of cache sharing between multiple components.

The L3 (Level 3) cache 109 is the largest, but also the slowest cache memory unit. While the L1 cache 107 and L2 cache 108 cache are provided for each processor 104, the L3 cache 109 is provided for all of the processors 104, and this is more akin to a general memory pool that the processor system 101 can make use of.

In general, during operation of the computer system 100, data flows from the system memory 103, via the bus 102, to the L3 cache 109, then the L2 cache 108, and finally to the L1 cache 107 prior to being used by a CPU 110 of a particular processor 104. When a CPU 110 is looking for data to carry out an operation, the CPU 110 may first try to find the data in its dedicated L1 cache 110, but if the data is not there, the CPU 110 may proceed to check the remainder of the cache down the hierarchy. If the CPU 110 finds the target data in the cache, this is called a cache hit. If the CPU 110 does not find the data in any of the memory caches, the CPU 110 may attempt to access the data from system memory 103—e.g., random access memory (RAM) or static memory (e.g., a hard drive or solid state drive). When the CPU 110 must go to the system memory 103 for data, this event is known as a cache miss.

The general management of the cache is usually transparent for user processes and it is usually performed by the hardware controller, such as the memory controller 106 in FIG. 1. Some cache designs allow software control, e.g., by the operating system (OS) or some privileged software executing on one or more of the cores 105. Regardless of the control scheme, the entity controlling the cache is considered to be trusted, so that it can guarantee that the cache behaves as expected.

The protection mechanism provided by embodiments of the present disclosure applies to the whole cache hierarchy, but the different cache levels might be treated differently depending on the protection needed and the attack scenario. For example, attacks that require hyperthreading may exploit core-private cache memories (e.g., the L1 cache 107), whereas cross-core attacks may use shared cache (e.g. the L2 cache 108 or L3 cache 109). In the former case, for example, an embodiment of the present disclosure could disable protection in the shared cache and focus on the core-private one. Regardless, embodiments of the present disclosure take into account that an attack may happen whenever two processes (namely, victim and attacker) share any of the cache.

The cache memories 107-109 are organized into a plurality of cache lines, with the size of each cache line representing the minimum amount of data that is loaded from system memory 103. The cache memories 107-109 store some metadata in addition to the data in the cache line. This metadata is generally used to evaluate whether the data is located in the cache and if it is still valid or not, to identify the process to which it belongs, to classify data into security domains, or to decide which line has to be replaced in case of conflict.

The protection mechanism, according to embodiments of the present disclosure, adds a sensitivity bit to each cache line. This bit is additional to the metadata that the cache design was using before implementation. That is, the addition of the sensitivity bit is a modification to the cache design introduced by the protection mechanism according to embodiments of the present disclosure.

Figure 2:
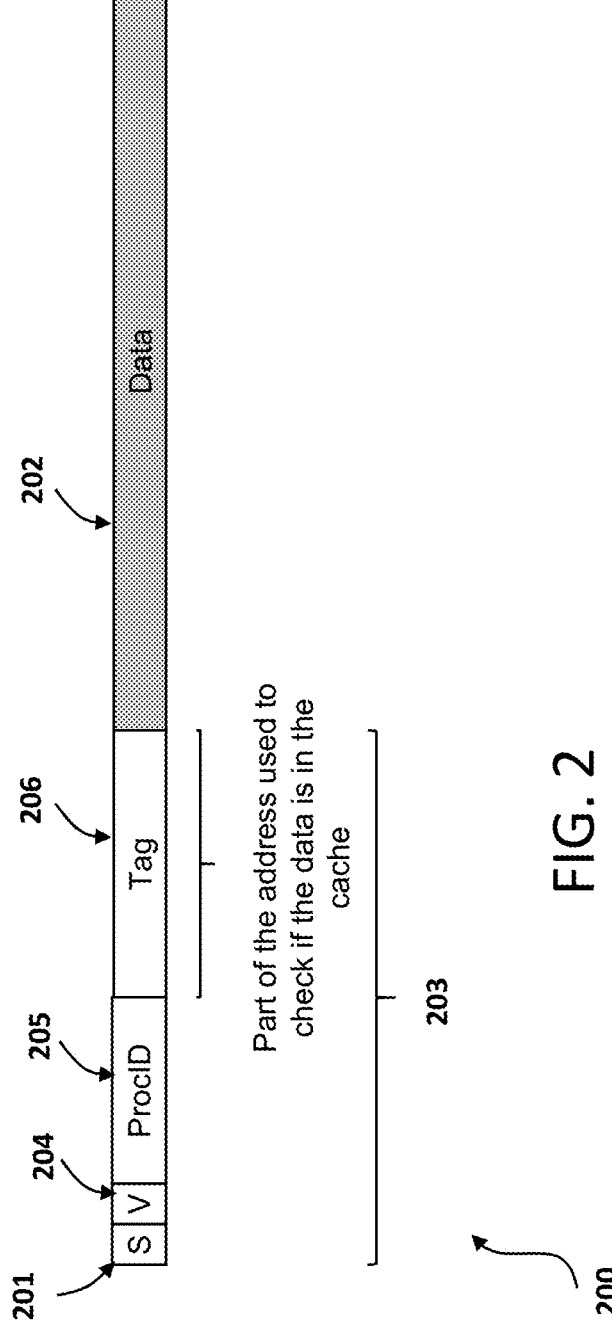
FIG. 2 illustrates a cache line with one bit added to label sensitivity according to an embodiment of the present disclosure.

FIG. 2 shows an example of a cache line 200 including a sensitivity bit(S) 201 added to track the lines that are to be protected. Note that only the "Data" resides in the main memory 202 of the cache line 200, the rest of the memory of the cache line 200 is for metadata 203, which may be added when the cache line 200 is written into the cache. The "Data" refers to the operated upon data—e.g., content that was fetched (directly or indirectly) from system memory or written by a CPU. While the sensitivity bit(S) 201 is shown as the first bit in the cache line 200, it may be any bit within the metadata 203.

With the exception of the added sensitivity bit(S) 201, the metadata 203 of the cache line 200 of the cache memory used in embodiments of the present disclosure may be organized as in existing systems. For example, as shown in FIG. 2, the metadata 203 may include a validity bit (V) 204, which indicates the validity of the data in the cache, a process identification (ProcID) 205 indicating the identity of the process using the data, and a label (Tag) 206 with is assigned to the "Data" so it can be quickly determined if the "Data" is in the cache and, if so, the data can be located in the cache.

The sensitivity bit can be added to both hardware and software-managed caches. For example, in software-managed caches, the sensitivity bit can be added by using a firmware update to assign this functionality to one of the free metadata bits if that is available or, if not, using a hardware modification.

The protection mechanism according to embodiments of the present disclosure uses what can be referred to as a trust, but verify, principle. That is, the protection mechanism assumes that the processes running on a computer system are not malicious, and in principle, the protection mechanism does not prevent the processes from modifying the cache state or from evicting data that belongs to the other processes. Nevertheless, the protection mechanism detects when a sensitive cache line has been removed by the actions of another process (or processes) and tracks evictions to decide whether the evictions are due to an attack or not.

Embodiments of the present disclosure leverage the insight that cache attacks need to interact with the victim data, either by evicting the victim data or by letting the victim data evict data belonging to the attacker. Embodiments of the present disclosure enable the detection of such interactions and the triggering of a countermeasure. The countermeasure prevents the undesirable interaction between victim and attacker once triggered.

Embodiments of the present disclosure allow for sensitive cache lines to be defined by the owner of a process. In other words, embodiments of the present disclosure allow the owner of a process to label data as sensitive. This provides a computational and time efficiency advantage because the protection mechanism need only be invoked for the sensitive cache lines.

According to an embodiment, a compiler is provided that is configured to recognize data labelled by a programmer as sensitive. To this end, the compiler provides for modifications to recognize data labelled by the programmer as sensitive.

In an exemplary embodiment, a compiler may be provided as a state of the art compiler modified to accept and support pragmas or directives that the programmer can use to communicate directly with the compiler. The compiler will then generate computer code that includes the aforementioned pragmas or directives. Exemplary pseudo code for such a compiler may include:

```
#pragma sensitiveon
#pragma sensitiveoff
```

Then, whenever the compiler finds these tags in the source code, the compiler could activate the sensitivity bit of a cache line by writing it into the binary:

```
If (sensitiveon) then:
    set_sensitivity_bit_to_1_in_the_binary
Else
Proceed as usual
```

Alternatively or additionally, the computer architecture could define a new instruction to enable or disable a bit on the cache lines.

Upon execution of the compiled code, the computer system 100 is able to recognize data labelled as sensitive, and when such data is written into cache, the cache line(s) associated with such sensitive data has its sensitivity bit activated. For example, the hardware controller (or software controller in case the cache is managed by software) checks for cache contention for data labelled as sensitive, and sets the sensitivity bit as appropriate. For example, in an exemplary embodiment, the hard controller is configured to monitor two cases: whether sensitive data is placed into the cache; and whether the sensitive data is replaced. First, it is assumed that the programmer has already defined a tolerance value that determines the threshold for some counts (i.e., tolerance_threshold). Under this assumption, pseudo code for the hardware controller may be expressed as:

```
If (cache line labeled as sensitive is replaced or loaded)
    then:
    store_and_update      (process      id,      time,
        totalEvictions, . . . )
    If (any of the stored values>tolerance_threshold) then:
        Trigger countermeasure
```

Here, process id refers to the process that causes the line to be loaded or removed.

Figure 3:
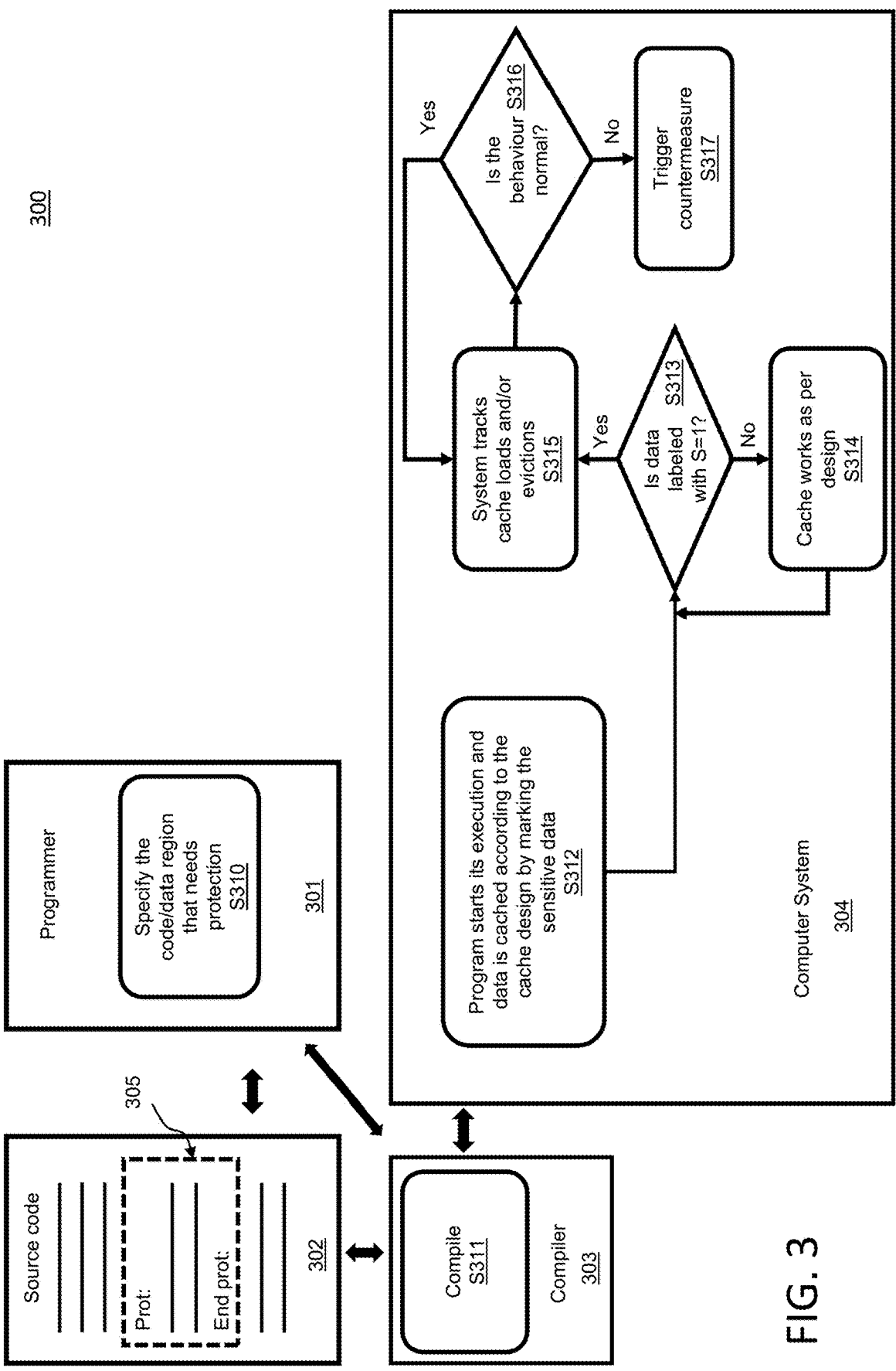
FIG. 3 schematically illustrates a method and system for detecting side channel attacks and countering the attacks to mitigate information leakage according to an embodiment of the present disclosure.

FIG. 3 shows an overview of the process and an overall system architecture 300 implementing a protection mechanism according to an embodiment of the present disclosure.

As shown in FIG. 3, a programmer 301 may write and/or modify code to perform a target operation. The programmer 301 may use a computer system with programming software/code editor to write the code. The code may be prepared as source code 302, as a shown in FIG. 3, or may be some other abstraction of instructions for performing the target operation.

The programmer 301 may also use a compiler 303 to convert the source code 302 into a machine code (or other lower-level abstraction of the instructions) for loading and execution on a target computing system 304. The compiler 303 may be implemented as software executed by one or more processors on the same or different computer system used by the programmer 301. The compiler 303 exposes a mechanism to the programmer 301 (e.g., via the programming software) that can be used by the programmer 301 to label data as sensitive in a way that the compiler can recognize such designation. The compiler 303 can then generate compiled code in such a way that the computer system 304 is able to recognize data labelled as sensitive. When the computer system 304 recognizes data labeled as sensitive, and such data is written into cache, the cache line(s) associated with such sensitive data has its sensitivity bit activated.

As discussed below, the system architecture 300 executes a set of operations to implement and utilize the protection mechanism according to an embodiment of the present invention.

The programmer 301 prepares source code 302 using the exposed mechanism of the compiler 303 to label parts 305 of the source code 302 and/or data used by the source code 302 as sensitive (S310). For example, as shown in FIG. 3, the programmer may tag the beginning of a protected part 305 with a "Prot:" and the end of the protected part 305 with "End prot." Additionally, the programmer 301 can specify a tolerance or a maximum number of interactions that are allowed before triggering a countermeasure. This can also be done with tags within the source code 302.

When one part of the source code 302 includes such a labeled part 305, the compiler 303 will compile the source code 302 with the labeled part 305 to generate machine code that can be executed by the computer system 304 (S311). The compiled code will include instructions for the computer system 304 to properly label the sensitive data in the cache and execute countermeasures.

The particular implementation of the compiled code may depend on whether there is a sensitivity instruction exposed by the computer architecture or not. In the case there is such an instruction, the generated binaries will have the instruction before and after the sensitive data. When no such instruction is exposed, and there is a directive just for the compiler, the compiler generate binaries that include at least the metadata referring to the sensitivity bit. In this case, whenever the binary is loaded by the processor and executed, the metadata can be directly loaded into the cache line.

The following operations occur on the computer system 304 that has received, loaded, and is executing the compiled code with labeled sensitive data.

The computer system 304, when executing the compiled code, will operate its cache according to aspects of the present disclosure to provide the disclosed protections.

The first stage of the protection may be considered as tracking sensitive data. For this stage, as described above, the programmer has already provided some input and selected parts of the code that need protection, and has potentially designated how many interactions are allowed before triggering the countermeasure (tolerance parameter).

To implement the tracking, as shown in FIG. 3, when loading labeled-sensitive data, the cache controller (e.g., memory controller of the processor system) can use one bit of the metadata in the cache line to mark corresponding data as sensitive (S312). For example, the computer system 304 may implement the cache line structure with the new sensitivity bit as described above. Under this implementation, data that is part of a protected region will be labeled by setting the sensitivity bit S to 1 in the cache line storing the labeled-sensitive data.

Alternatively or additionally, a tolerance parameter may be used for the sensitive data. For example, if all (or substantially all parts) of the code are indicated as requiring protection, the computer system may rely on (e.g., only rely on) the tolerance parameter for initiating countermeasures. In this case, the tolerance parameter may be recorded in the metadata of cache line (e.g., if the tolerance parameter is configurable based on the data) or may a global parameter. As with the sensitivity bit, the programmer 301 may use an exposed mechanism of the compiler 303 to set the tolerance parameter for one or more parts of the source code 302. The compiler 303 may then compile the code to indicate the tolerance parameter associated with the code for use by the computer system 304. Depending on the implementation, a default of preset tolerance could be used by the computer system 304. Here, when the program starts its execution, data is cached according to the cache design by marking the sensitive data using at least the tolerance parameter (S312).

Additionally, if not already included in the aforementioned metadata, some extra bits may be used to track the identification of the processes interacting with that data.

The next stage may be referred to as cache monitoring or attack detection. Cache monitoring takes place during the execution of the protected process, and tracks when data with the sensitive bit set is placed into the cache and when such data is removed from the cache. The protection mechanism analyzes interactions through the cache between other processes and the protected data, and detects suspicious behavior (e.g., sensitive data is evicted frequently from the cache or evicted by means of a cache flush (clflush) instruction).

Interactions of data belonging to other processes (i.e., not the "protected process") with such data will be then closely monitored. For example, whenever there is an insertion of that data into the cache, the cache controller will check the sensitive data's previous state to determine: (1) if it has been recently in the cache; and (2) which entity or malicious process evicted it.

FIG. 3 illustrates an exemplary implementation of this cache monitoring stage.

First, the cache controller checks if particular data should be monitored (e.g., when the data is loaded into the cache)

(S313). In the embodiment shown, this is done by checking to see if the data is labeled with its sensitivity bit set to 1. Alternatively or additionally, data could be, by default, monitored. In this case, this step could be skipped, or an alternative opt-out bit may be checked to avoid monitoring.

If none of the processes running on the computer system 304 require protection (e.g., S=0), the cache can behave as usual, and the cache controller acts as if there was no protection mechanism implemented (S314). If a process or target data is designated as requiring protection (e.g., all or some of the labelled data of the process is placed into the cache with a sensitive bit set to 1), then the computer system 304 uses the protection mechanism of an embodiment of the present disclosure to look for attacks. Here, the metadata of one or more cache lines may be used for such purpose, in which case the metadata may be initialized (e.g., by zero out tracker bit(s) within the metadata). Alternatively, another memory area may be used for tracking.

As shown in FIG. 3, the computer system 304 tracks interactions with the subject cache memory (e.g., cache line) to look for attacks (S315).

Cache memories feature two main interactions: loads to cache (when data is fetched from main memory and placed into the cache) and stores to main memory (when data is removed from the cache). The information referring to these two interactions can be used to detect attacks. The behavior of one process interacting with the cache is defined as an attack whenever some present conditions are met. These conditions depend on the threat model considered.

For example, if only protection against so-called Flush+ Reload attacks and their family is needed (which usually also involves some speculative execution attacks), the attack detection mechanism according to an embodiment of the present disclosure may simply count evictions due to clflush instructions and insertions happening after this instruction. If the number of evictions goes over a certain threshold, the countermeasure will be triggered. The threshold can depend on the application that requires protection and/or be defined by the programmer, or it can be preset based on the type of application or based on historical data. For example, if an application is to protect an implementation of a Rivest-Shamir-Adleman RSA cryptosystem that requires multiple evictions (at least as many as the key bit size) before the key is leaked, the programmer may decide to allow up to half of the bit size to limit the leakage up to a half key. To this end, embodiments of the present disclosure allow the user (e.g., the developer of the protected application) to define the threat model by means of the tolerance, which in turn defines the threshold.

Similarly, cache attacks interact with the victim data/ process before and after the execution of the victim data/ process. For example, if the detection mechanism according to an embodiment of the present disclosure detects that data is evicted from the cache due to one process that interacts with the cache just after the victim process has run its code, this is usually a good indicator that such a situation corresponds to an attack. Therefore, the detection mechanism according to an embodiment of the present disclosure keeps track of at least the previous and current state of the cache line.

Regardless of the threats being monitored and the conditions being evaluated, the computer system 304 will use these conditions and its trackers to determine whether the behavior is "normal" (i.e., not an attack) or is abnormal (i.e., is (likely) an attack) (S316). If the behavior is normal, the computer system 304 will continue processing the data as normal, but also keep tracking the interactions of the sensitive data.

However, if the behavior is not normal (e.g., exceeds an interaction threshold defined by the tolerance value), the computer system 304 will trigger a countermeasure (S317). As described above, in some implementations, all data of a protected process is evaluated against the interaction threshold, which may be a global variable of the process.

If the trigger is activated, the protection mechanism implemented according to an aspect of the present disclosure causes the computer system 304 to execute one or more countermeasures that prevent future/subsequent interactions between the process that was maliciously interacting with (e.g., loading or evicting) data from the protected region. In other words, the protection mechanism enters the countermeasure stage.

The countermeasures that are taken can differ depending on the underlying architecture, but can be triggered and act in the same manner: as soon as an attack is detected (i.e., on demand), the countermeasure impedes the interaction of data belonging to any other process with the protected data. For example, if the cache allows the randomization of the mapping function, the detection triggers the rekeying function, and such a process is only triggered if an attack attempt is detected, thereby avoiding performance degradation. Alternatively or additionally, if the cache supports partitioning, this may be only enforced once an attack attempt has been detected.

While state of the art cache may already be configured with a mapping function, a function to randomize the mapping function, and a rekeying function, aspects of the present disclosure interact with these functions in a new way. For example, in a case where the mapping function acts like:

Cache_line=Function (virtual or physical address of the code or data).

A counter measure implemented according to the present disclosure may execute:

If (attack is detected)
Then define new mapping function so that:
Cache_line=Function_new (virtual or physical address of the code or data)

In this case, Function_new is defined so the selection of cache line looks random and independent of the addresses.

For other cache designs, an embodiment of the present disclosure can be used to prevent protected data from being evicted by trying to minimize the hardware modifications. One possible way to do so would be to modify replacement policies (algorithms that decide which data to evict).

One common replacement policy implemented in cache memories is known as "least recently used" (and approximations of it). With this replacement policy, the replaced cache line is the one that has been the longest time in the cache without being used. The cache stores some metadata to know which data to evict. In an embodiment of the present disclosure, the metadata is modified so that the protected cache line can never become the "least recently used", which prevents new changes on the metadata until the protection is not needed anymore. An example of pseudo code implementing such a feature includes:

If (attack is detected) then:
Get replacement policy control metadata
for all_sensitive_lines:
modify_metadata_to_prevent_eviction
Thus, impeding automatic metadata update for those lines.

Figure 4:
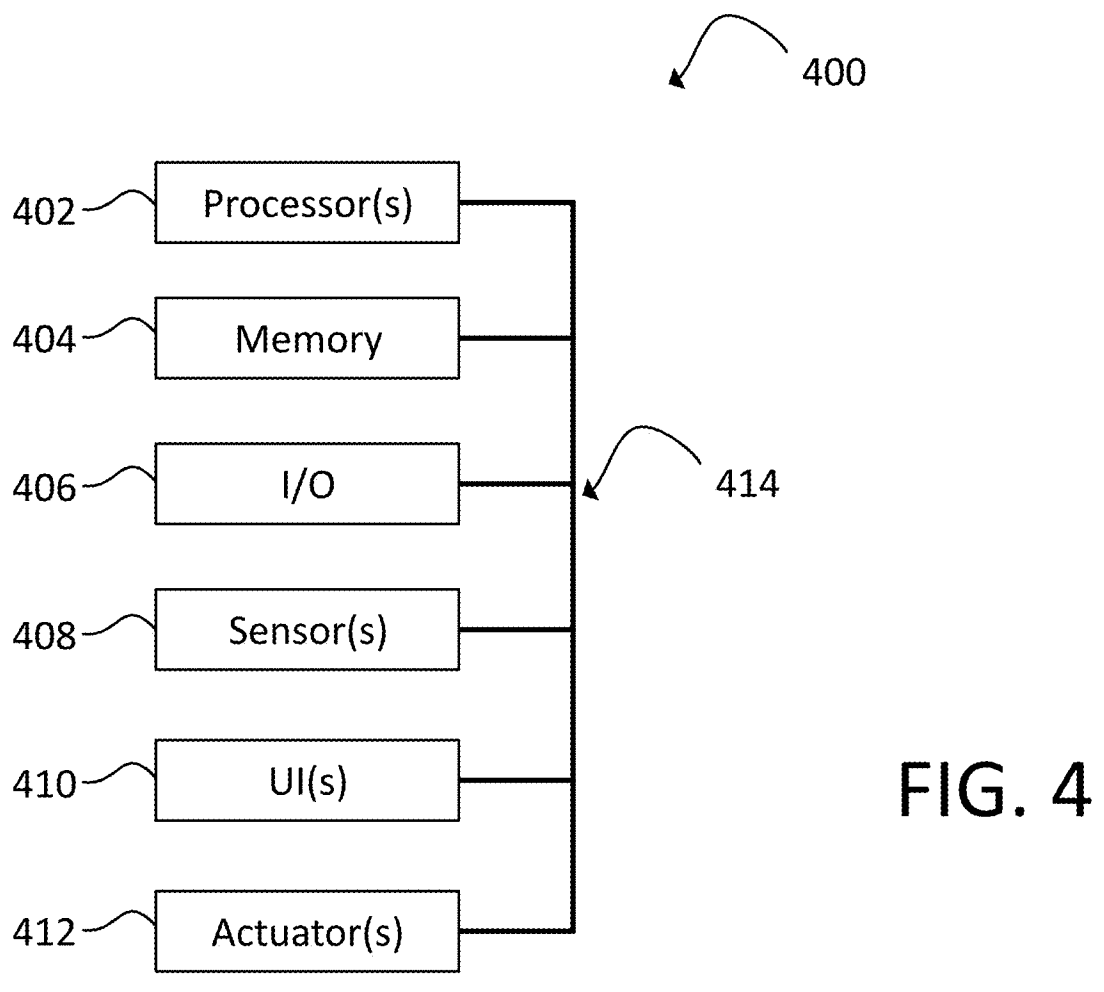

FIG. 4 illustrates an exemplary processing system that may be used to implement one or more of the computer systems of the programmer, compiler, and/or computer system executing the sensitive data using the protection mechanism of the present disclosure. That is, the processing system 400 is an example of each computing system disclosed herein.

The processing system 400 can include one or more hardware processors 402, memory 404, one or more input/output devices 406, one or more sensors 408, one or more user interfaces 410, and one or more actuators 412. A bus 412 may be used to pass data between these entities. In relation to FIG. 1, the processor system 101, bus 102, and system memory 103 may correspond to the processor 402, bus 412, and memory 404 of FIG. 4.

Processors 402 can include one or more distinct processors, each having one or more cores. Each of the distinct processors can have the same or different structure. Processors 342 can include one or more central processing units (CPUs), one or more graphics processing units (GPUs), circuitry (e.g., application specific integrated circuits (ASICs)), digital signal processors (DSPs), and the like based on the needs of the implementation. Processors 402 can be mounted to a common substrate or to multiple different substrates.

Processors 402 are configured to perform a certain function, method, or operation (e.g., are configured to provide for performance of a function, method, or operation) at least when one of the one or more of the distinct processors is capable of performing operations embodying the function, method, or operation. Processors 402 can perform operations embodying the function, method, or operation by, for example, executing code (e.g., interpreting scripts) stored on memory 404 and/or trafficking data through one or more ASICs. Processors 402, and thus processing system 300, can be configured to perform, automatically, any and all functions, methods, and operations disclosed herein. Therefore, processing system 400 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 400 can be configured to perform task "X". Processing system 400 is configured to perform a function, method, or operation at least when processors 302 are configured to do the same.

Memory 404 can include volatile memory, non-volatile memory, and any other medium capable of storing data. Each of the volatile memory, non-volatile memory, and any other type of memory can include multiple different memory devices, located at multiple distinct locations and each having a different structure. Memory 404 can include remotely hosted (e.g., cloud) storage.

Examples of memory 404 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 404.

Input-output devices 406 can include any component for trafficking data such as ports, antennas (i.e., transceivers), printed conductive paths, and the like. Input-output devices 306 can enable wired communication via USB®, Display-Port®, HDMI®, Ethernet, and the like. Input-output devices 406 can enable electronic, optical, magnetic, and holographic, communication with suitable memory 406. Input-output devices 406 can enable wireless communication via WiFi®, Bluetooth®, cellular (e.g., LTE®, CDMA®, GSM®, WiMax®, NFC®), GPS, and the like. Input-output devices 306 can include wired and/or wireless communication pathways.

Sensors 408 can capture physical measurements of environment and report the same to processors 402. User interface 410 can include displays, physical buttons, speakers, microphones, keyboards, and the like. Actuators 412 can enable processors 302 to control mechanical forces.

Processing system 400 can be distributed. For example, some components of processing system 400 can reside in a remote hosted network service (e.g., a cloud computing environment) while other components of processing system 400 can reside in a local computing system. Processing system 400 can have a modular design where certain modules include a plurality of the features/functions shown in FIG. 4. For example, I/O modules can include volatile memory and one or more processors. As another example, individual processor modules can include read-only-memory and/or local caches.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method for mitigating side channel attacks in cache memory, the method comprising:
   loading data into a cache line of the cache memory, which comprises marking the data as sensitive in metadata of the cache line in a case that the data is tagged as sensitive;

tracking interactions with the data marked as sensitive in the cache memory without using another memory area for the tracking; and determining whether the interactions with the data are not normal based on a preset criteria and the tracked interactions with the data.

2. The method according to claim 1, further comprising triggering an attack countermeasure based on determining that the interactions with the data are not normal.

3. The method of claim 1, wherein the preset criteria is a tolerance parameter setting a number of interactions with the data, and wherein determining whether the interactions with the data are not normal comprises determining that the number of tracked interactions exceeds the tolerance parameter.

4. The method of claim 1, wherein the data is used by a first process, and wherein tracking the interactions with the data comprises tracking a number of interactions with the data only by one or more processes different than the first process.

5. The method of claim 4, wherein upon loading the data into the cache memory, a process identification field of the metadata in the cache line is set identifying the first process as an owner of the data, and wherein the method further comprises identifying the interactions with the data as done only by one or more of the processes that are different than the first process based on a process identification of an interacting process that is different than that in the process identification field.

6. The method of claim 4, wherein the interactions comprise cache loads or cache evictions.

7. The method of claim 1, wherein the metadata of the cache line comprises a sensitivity bit, and wherein marking the data as sensitive in the metadata of the cache line comprises setting the sensitivity bit based on the data that is tagged as sensitive.

8. The method of claim 7, wherein tracking the interactions with the data is performed only for the data having the sensitivity bit tagged as sensitive and not for other data in the cache memory.

9. The method of claim 8, wherein tracking the interactions with the data includes tracking cache evictions and cache loads after the cache evictions, and wherein the preset criteria includes a threshold count of the cache evictions, and wherein the threshold count is defined by a user, preset based on a type of application, or based on historical data.

10. The method of claim 1, the method further comprising, prior to loading the data into the cache line:
   receiving executable code compiled from source code by a compiler, the source code comprising program data labelled as sensitive by a programmer, the executable code is produced by the compiler such that a computer system executing the code is configured to detect the program data labelled as sensitive in the executable code;
   executing the executable code and detecting the program data labelled as sensitive,
   wherein the program data labelled as sensitive comprises the data loaded into the cache line.

11. The method of claim 2, wherein the attack countermeasure is initiated in an automated manner and impedes an interaction of data belonging to any other process other than a process that has been previously identified as owning the data.

12. The method of claim 11, wherein upon triggering the attack counter measure, a randomization of a cache mapping function is executed, wherein the randomization of the cache mapping function includes defining a new mapping function so that a selection of the cache line looks random.

13. The method of claim 11, wherein upon triggering the attack counter measure, a partitioning of the cache mapping executed.

14. The method of claim 11, wherein upon triggering the attack counter measure, a modification of a cache replacement policy is executed, wherein the modification of the cache replacement policy for the cache memory prevents automatic metadata updating for the cache line.

15. The method of claim 10, wherein the source code includes tags provided by the programmer that specify a maximum number of interactions that correspond to the preset criteria.

16. The method of claim 1, the method further comprising:

determining second data is not labeled as sensitive;

loading the second data into a second cache line of the cache without marking the second data as sensitive in metadata of the second cache line; and operating on the second data without tracking interactions with the second data.

17. The method of claim 1, wherein, for tracking the interactions with the data, the metadata is initialized using a tracker bit within the metadata.

18. A processing system comprising one or more hardware processors which, alone or in combination, are configured to provide for execution of a method for mitigating side channel attacks in cache memory, the method comprising:

loading data into a cache line of the cache memory, which comprises marking the data as sensitive in metadata of the cache line in a case that the data is tagged as sensitive;

tracking interactions with the data marked as sensitive in the cache memory without using another memory area for the tracking; and determining whether the interactions with the data are not normal based on a preset criteria and the tracked interactions with the data.

19. A tangible, non-transitory computer-readable medium having instructions thereon which, upon execution by one or more hardware processors, alone or in combination, provide for execution of a method for mitigating side channel attacks in cache memory, the method comprising:

loading data into a cache line of the cache memory, which comprises marking the data as sensitive in metadata of the cache line in a case that the data is tagged as sensitive;

tracking interactions with the data marked as sensitive in the cache memory without using another memory area for the tracking; and determining whether the interactions with the data are not normal based on a preset criteria and the tracked interactions with the data.

\* \* \* \* \*